US012803493B2

(12) United States Patent
Smadja

(10) Patent No.: US 12,803,493 B2
(45) Date of Patent: Nov. 17, 2026

(54) FLOATING PHOTOVOLTAIC GENERATION SYSTEMS

(71) Applicant: AREMA ENERGIES COMPANY, Toulouse (FR)

(72) Inventor: Charles Smadja, Toulouse (FR)

( * ) Notice: Subject to any disclaimer, the term of this patent is extended or adjusted under 35 U.S.C. 154(b) by 0 days.

(21) Appl. No.: 18/711,559

(22) PCT Filed: Apr. 24, 2024

(86) PCT No.: PCT/IB2024/053978
§ 371 (c)(1),
(2) Date: May 20, 2024

(87) PCT Pub. No.: WO2024/194854
PCT Pub. Date: Sep. 26, 2024

(65) Prior Publication Data
US 2026/0180493 A1 Jun. 25, 2026

Related U.S. Application Data

(60) Provisional application No. 63/491,271, filed on Mar. 20, 2023.

(51) Int. Cl.
*H02S 20/23* (2014.01)
*B63B 35/38* (2006.01)
(Continued)

(52) U.S. Cl.
CPC .............. *H02S 20/23* (2014.12); *B63B 35/38* (2013.01); *B63B 35/44* (2013.01);
(Continued)

(58) Field of Classification Search
CPC .......... H02S 20/00; H02S 20/23; H02S 20/30; H02S 30/10; B63B 35/38; B63B 35/44;
(Continued)

(56) References Cited

U.S. PATENT DOCUMENTS 4,315,500 A * 2/1982 Gonder .................. F24S 20/20 126/567
7,891,351 B2 * 2/2011 Hinderling ............. F24S 40/00 126/576
(Continued)

FOREIGN PATENT DOCUMENTS

CN 105799874 A * 7/2016 ............ B63B 35/44
CN 115733433 A * 3/2023
(Continued)

*Primary Examiner* — T. Scott Fix
(74) *Attorney, Agent, or Firm* — Guy Cumberbatch

(57) ABSTRACT

A floating solar system having a buoyant outer pontoon defining a peripheral shape within which is suspended an array of individual photovoltaic panels supported by floating boxes and frames. The buoyant border pontoon may be made of pipes connected together by electrofusion fittings and electrofusion elbows, and defines a closed peripheral (preferably) rectangular shape surrounding an interior space. Within the interior space an array of interconnected rigid photovoltaic or solar panels mount on floating boxes and frames. The solar panels are evenly distributed within the peripheral shape and structurally fixed to the pontoon by one or several nets or mesh wrapped around each pipe, extending across to substantially fill the interior space defined within the pontoon. Rows of photovoltaic panels may be paired with the photovoltaic panels in the adjacent rows angled upward toward each other to provide a tent-like shape which better withstands wind forces.

24 Claims, 11 Drawing Sheets

(51) Int. Cl.

| | |
|---|---|
| ***B63B 35/44*** | (2006.01) |
| ***H02S 20/00*** | (2014.01) |
| ***H02S 20/30*** | (2014.01) |
| ***H02S 30/10*** | (2014.01) |

(52) U.S. Cl.
CPC .......... *B63B 35/4413* (2013.01); *H02S 20/00* (2013.01); *H02S 20/30* (2014.12); *H02S 30/10* (2014.12); *B63B 2035/4453* (2013.01)

(58) Field of Classification Search
CPC ........ B63B 35/4413; B63B 2035/4453; B63B 2035/4433; B63B 2035/444; B63B 2035/4446; B63B 2035/4466
USPC .......................................................... 114/292
See application file for complete search history.

(56) References Cited

U.S. PATENT DOCUMENTS

| | | | | |
|---|---|---|---|---|
| 10,141,885 | B2 | 11/2018 | Smadja | |
| 10,411,643 | B2 | 9/2019 | Smadja | |
| 10,644,645 | B2 | 5/2020 | Bjorneklett | |
| 11,050,382 | B2 | 6/2021 | Motohashi | |
| 11,290,054 | B2 | 3/2022 | Lee | |
| 11,332,223 | B2 | 5/2022 | Van Hoeken | |
| 2010/0024422 | A1 * | 2/2010 | Henderson ................ | C02F 1/14 60/641.8 |
| 2010/0294331 | A1 | 11/2010 | Carnation | |
| 2013/0146127 | A1 | 6/2013 | Lunoe | |
| 2013/0240025 | A1 | 9/2013 | Bersano | |
| 2017/0040926 | A1 | 2/2017 | Smadja | |

FOREIGN PATENT DOCUMENTS

| | | | | | |
|---|---|---|---|---|---|
| WO | WO-2008125154 | A1 * | 10/2008 | .............. | F24S 30/48 |
| WO | WO-2021035259 | A1 * | 2/2021 | ............. | H02S 20/00 |
| WO | 2021037756 | | 3/2021 | | |

* cited by examiner

FIG. 9
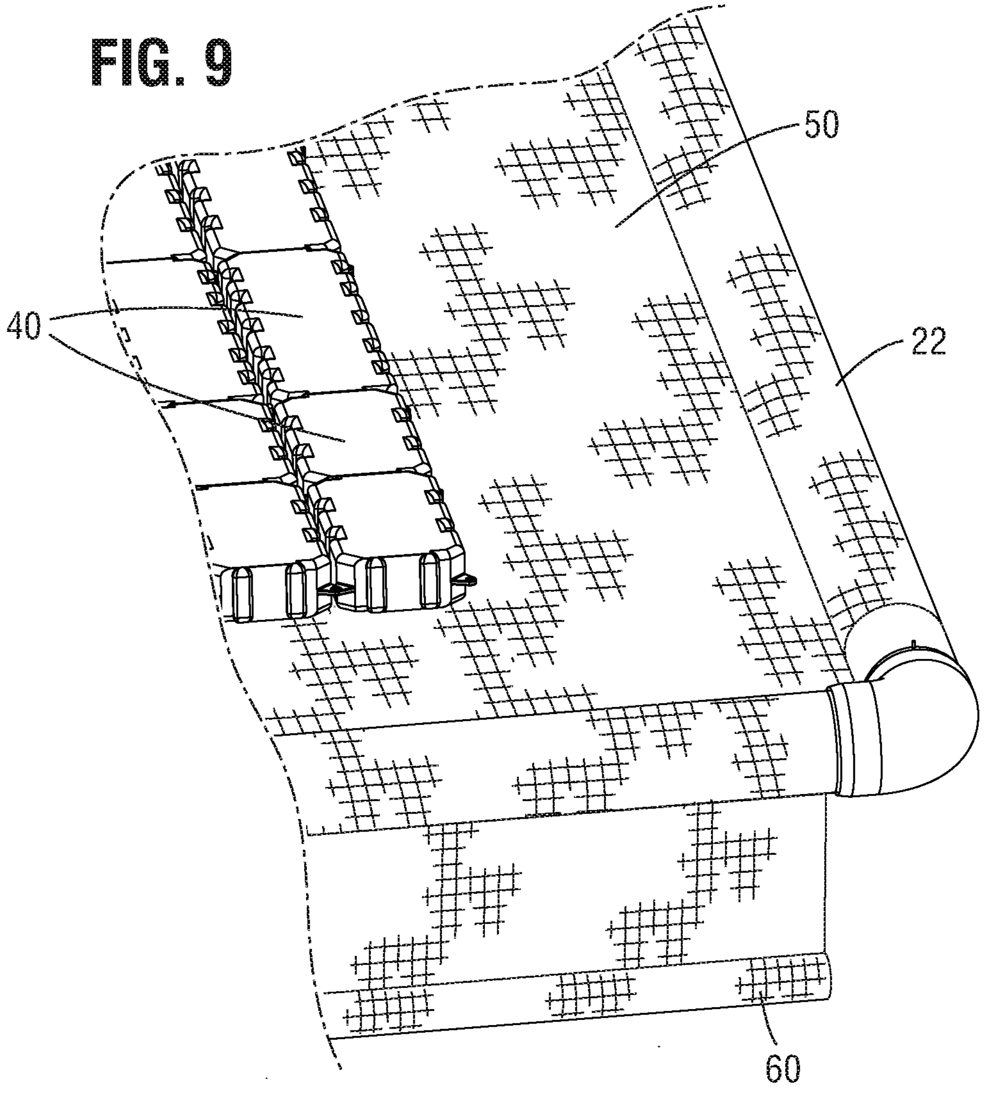
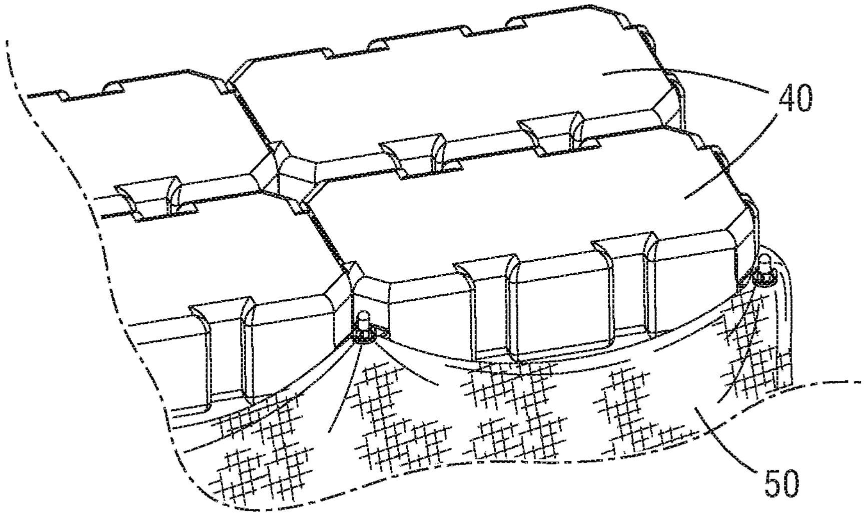
FIG. 10

FLOATING PHOTOVOLTAIC GENERATION SYSTEMS

RELATED APPLICATIONS

The present application is a National Stage under 35 U.S.C. § 371 of PCT Application No. PCT/IB2024/053978, which claims priority to U.S. 63/491,271, filed Mar. 20, 2023, the contents of which are expressly incorporated herein.

FIELD OF THE INVENTION

The present application pertains to photovoltaic systems and, more particularly, to systems of floating solar panels and floats therefor.

BACKGROUND OF THE INVENTION

During the next decades, the generation of sustainable energy will become one of the main challenges of our civilization. Worldwide energy demand is expected to grow from about 10 GTep ($10^{10}$ Tep [Ton Equivalent Petrol], or $5*10^{19}$ Joule) in the beginning of the century to 15-20 GTep by 2050. Some scenarios predict even levels as high as 40 GTep. An analysis of future global petrochemical consumption needs (i.e. energy needs and/or raw material for chemical industry) implies that early petrol shortages might already appear in the mid of the century. The need for large scale renewable energy sources is underlined by the global warming due to increasing $CO_2$ levels which is a by-product of the energy generation process using any kind of fossil fuel.

These predictions have stimulated rapid growth in the development of renewable energy. Wind farms, hydroelectric power plants, thermal power stations, and solar power plants all need a certain area of land, which is costly and can negatively affect the environment.

Solar energy is a clean and inexhaustible natural resource and one of the most promising renewable energy sources. An estimated 10,000 GTep of solar radiation reaches the earth every year, while perhaps only 5 GTep of usable solar power would be needed to make a significant step toward global energy sustainability. However, for solar power plants to offer the same generating capacity and supply stability as traditional power plants, the required land area is enormous.

Ocean accounts for about ¾ of the total area of the Earth. In order to efficiently use the available surface area, therefore, solar power could be moved to oceans or lakes, improving the utilization of land while preserving human living space and land for agriculture. Consequently, floating solar arrays have generated great interest in recent years. One discussion of this technology appears in "Solar Islands: A new concept for low-cost solar energy at very large scale," posted by Francois Cellier on May 20, 2008 in The Oil Drum: Europe (http://europe.theoildrum.com/node/4002). Other designs appear in the patent databases, such as in U.S. Pat. Nos. 4,350,143; 7,063,036; 7,891,351; 8,176,868; and 8,183,457; and in U.S. Patent Publication Nos. 2007/0283999; 2008/0257398; 2009/0314926; 2011/0291417; 2012/0305051; 2013/0146127; 2014/0034110; 2016/0156304 and 2017/0040926.

Despite much study, there remains a need for a floating photovoltaic system which can overcome the problem encountered in the prior art.

SUMMARY OF THE INVENTION

This application presents a floating device allowing solar photovoltaic panels to float on bodies of water. One floating solar system comprises a border pontoon adapted to float on water defining a closed peripheral shape surrounding an interior space. An array of interconnected photovoltaic panels are distributed within the peripheral shape, and each panel is supported by a floating frame. A plurality of floating boxes surround the array of photovoltaic panels and floating frames, the floating boxes being attached to the floating frames. Finally, a flexible net or mesh extends between an outer row of floating boxes and the border pontoon, the flexible net or mesh connected to both of the outer row of floating boxes and the border pontoon.

Another exemplary floating solar system again comprises a border pontoon adapted to float on water defining a closed peripheral shape surrounding an interior space. An array of interconnected photovoltaic panels distributed within the peripheral shape is structurally supported by floating boxes and frames. The buoyant border pontoon may be made of pipes connected together by electrofusion fittings and electrofusion elbows, and defines a closed peripheral (preferably) rectangular shape surrounding an interior space. Within the interior space an array of interconnected rigid photovoltaic or solar panels mount on floating boxes and frames. The solar panels are evenly distributed within the peripheral shape and structurally fixed to the pontoon by one or several nets wrapped around each pipe, extending across to substantially fill the interior space defined within the pontoon. If the peripheral shape is rectangular, the solar panels are evenly distributed in rows and columns to maximize space usage.

Beneficially, the system may include one or more of the following aspects:

- The anchors and mooring lines may be attached to the border pontoon, and not to the array of floating boxes and frames.
- Several floating solar systems as described herein may be connected together to create a floating solar island.
- Plastic bolt and nut connections between floating boxes and frames in the outside rows may be inserted in a mesh of the surrounding netting.
- Bolts and nuts may consist of a plastic threaded rod with two plastic nuts on each side of the rod.
- Washers on the bolts may be inserted between the eyelets of the floating boxes and the nuts, and the washers may be made of a soft material like rubber or neoprene.
- The width of the nets may be longer than the gap between the pipes and the floating boxes and frames.
- The added width of the nets on two opposite sides of the rectangular pipes may be longer than the added gaps between the pipes and the floating boxes and frames.
- The length of the nets may be longer than the length of the pipes.
- Two consecutive nets may be attached together by some chords or some strings, or by some pieces of nets attached to the nets around the pipes.
- The photovoltaic panels may be angled from 5-25 degrees, preferably 15-20 degrees, from the horizontal, wherein two adjacent rows create a chevron to help the structure to resist wind forces.
- The floating frames carrying the photovoltaic panels may be composed by a horizontal floating platform and four (4) supporting arms.
- The distance between two adjacent modules in the same line may be above 15 cm.
- The pontoons may comprise tubular members made of tubes of high density polyethylene.
- The floating boxes and frames may be made of high density polyethylene.

The pontoons may comprise tubular members partly filled with water for ballast.

In some embodiments, a stabilizing skirt made of an extension of the net is inserted around the pipes, depending downwardly from the border pontoon to surround a column of water underneath the array of photovoltaic panels. The skirt is weighted to remain substantially vertical in the water and form a barrier around the column of water so as to create a more stable volume of water within the peripheral shape than outside of the border pontoon. The stabilizing skirt may comprise horizontal pipes made of a material having a higher density than water, interconnected by a rope making a loop inserted inside the pipes. The skirt may have a depth that is between about 10-40% of the width of the closed peripheral shape.

BRIEF DESCRIPTION OF THE DRAWINGS

Features and advantages of the present invention will become appreciated as the same become better understood with reference to the specification, claims, and appended drawings wherein:

FIG. 9 is an enlarged perspective view of one corner of the solar system disclosed herein, illustrating a series of flexible nets or mesh extending between outer rows of floating boxes and the border pontoon, as well as a stabilizing skirt;

FIG. 10 is a perspective view of several of the outer floating boxes and a portion of the flexible net attached thereto;

DETAILED DESCRIPTION OF THE PREFERRED EMBODIMENTS

The present application discloses a number of floating solar units or systems each having a peripheral buoyant pontoon within which is suspended an array of individual photovoltaic panels.

The floating solar systems may be deployed in any body of water large enough to receive them. The size of the units may vary from relatively small (10 meters wide) to quite large. An exemplary floating solar system has a dimension across any two sides of between about 40 to 80 meters, meaning the most suitable sites for deployment are in large lakes, seas or the ocean. Indeed, if multiple floating solar systems of 80 meters wide are connected, the overall size is huge, and the vast areas of the ocean are preferred. For the purpose of simplicity, the application will describe the floating solar systems deployed in an ocean, although the reader will understand that other deployment locations are certainly possible.

Figures 1, 2:
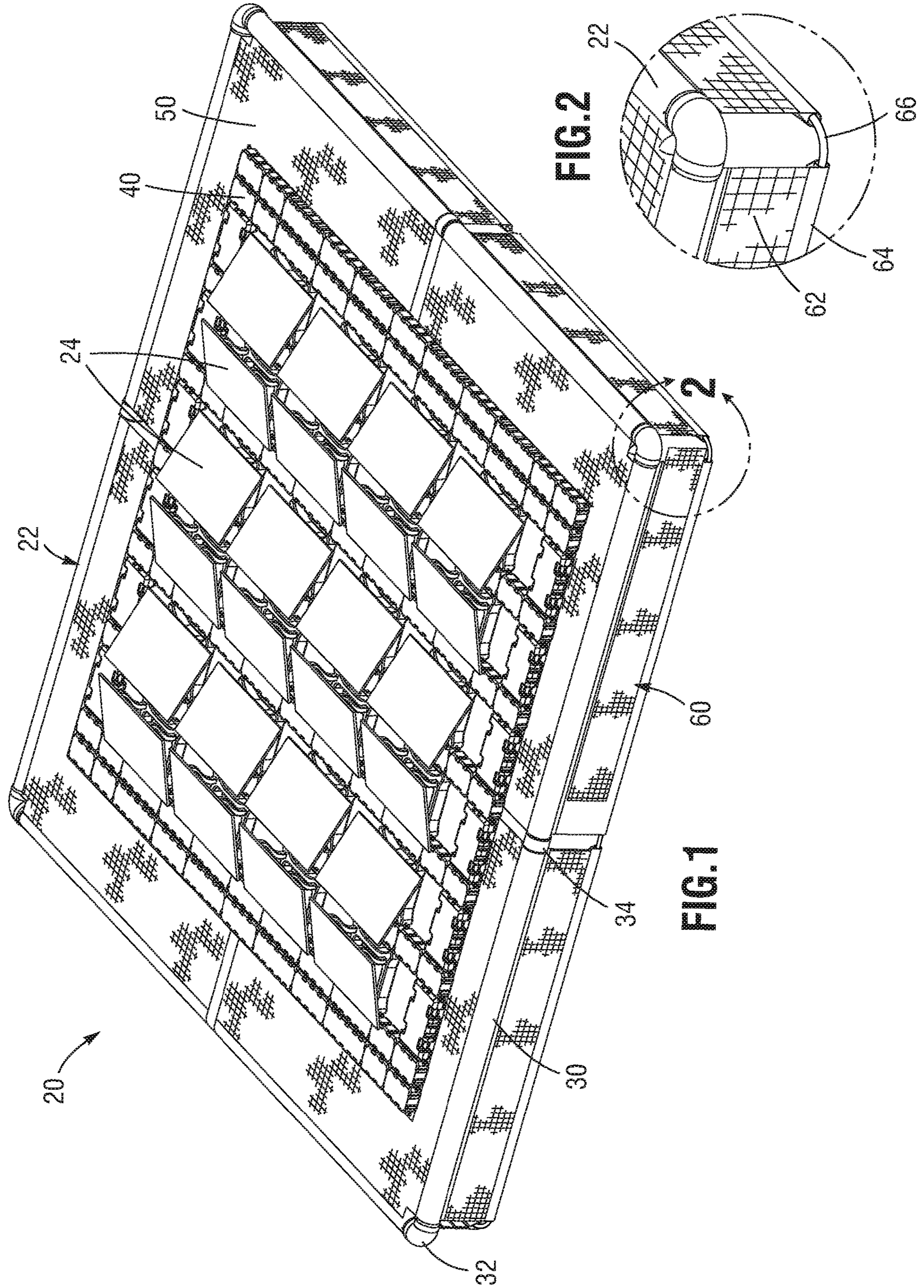
FIG. 1 is a perspective view of an exemplary floating solar system comprising a border pontoon defining a closed peripheral shape surrounding an interior space in which are distributed a plurality of floating photovoltaic panels.
FIG. 2 is an enlarged perspective view of one corner of the solar system of FIG. 1.
Figure 3:
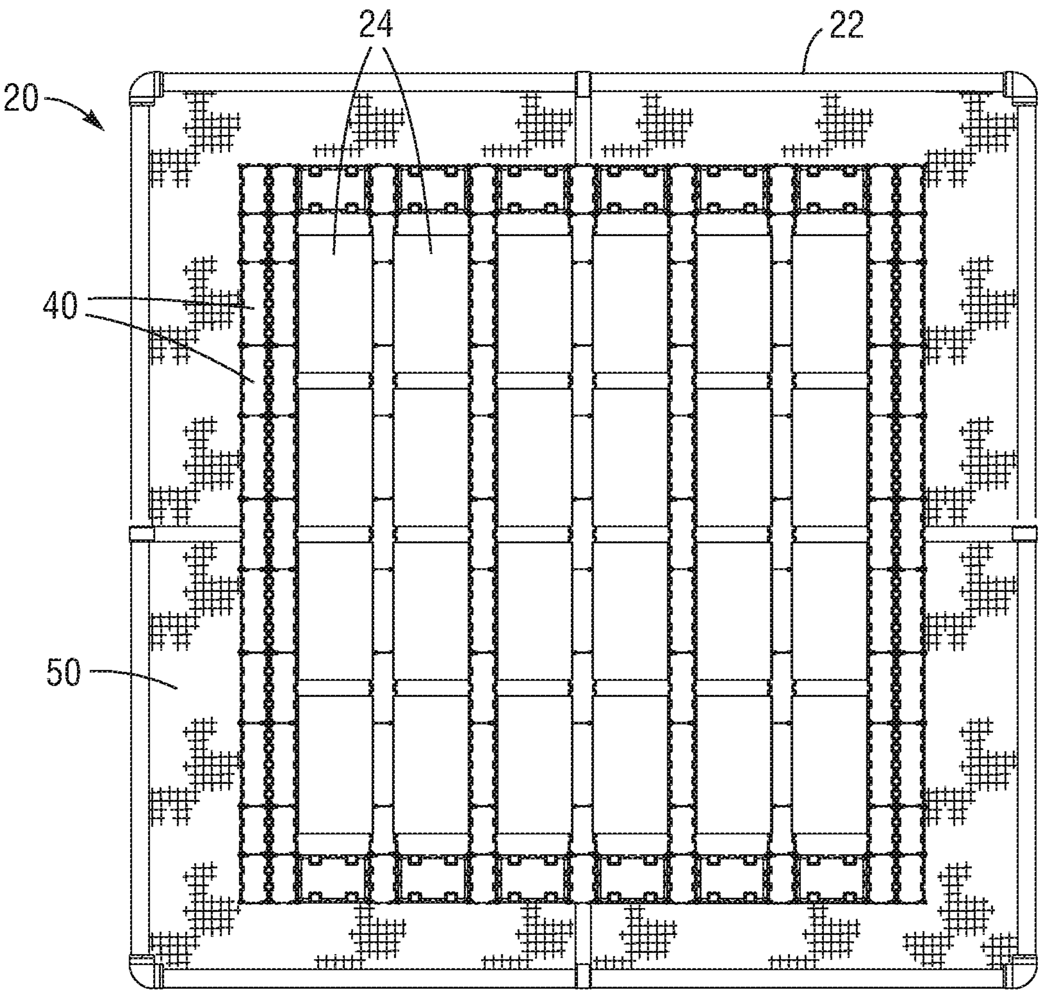
FIG. 3 is a top plan view of the solar system of FIG. 1.
Figure 4:
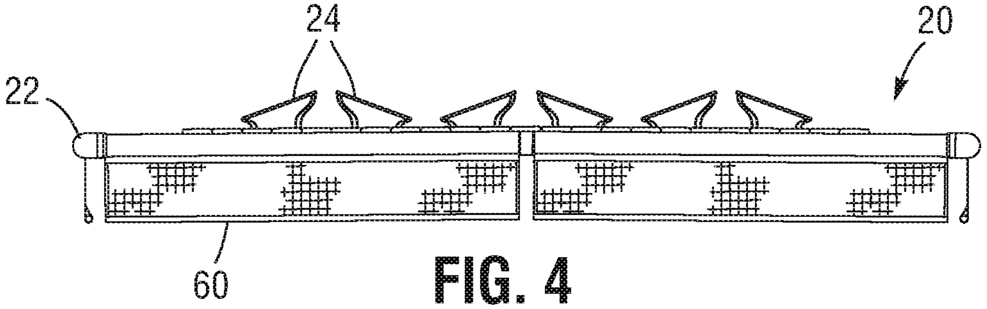
FIG. 4 is a front elevational view of the solar system of FIG. 1.
Figure 5:
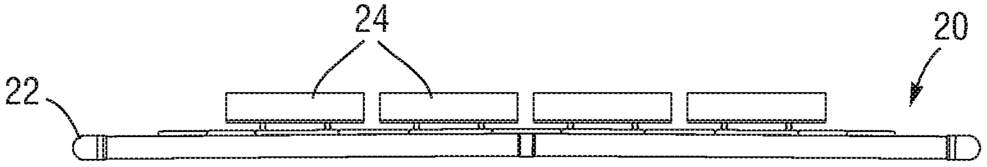
FIG. 5 is a side elevational view of a modified solar system of FIG. 1 without a stabilizing skirt.

FIG. 1 is a perspective view of an exemplary floating solar system 20 comprising a border pontoon 22 defining a closed peripheral shape surrounding an interior space in which are distributed a plurality of floating photovoltaic panels 24. FIG. 2 is an enlarged perspective view of one corner of the solar system, FIG. 3 is a top plan view, and FIGS. 4 and 5 are front and side elevational views thereof. The closed peripheral shape defined by the border pontoon 22 may be a variety of shapes, but is desirably polygonal; either square or rectangular, as shown. As such, the border pontoon 22 includes four straight sides meeting at four corner vertices.

Figure 12:
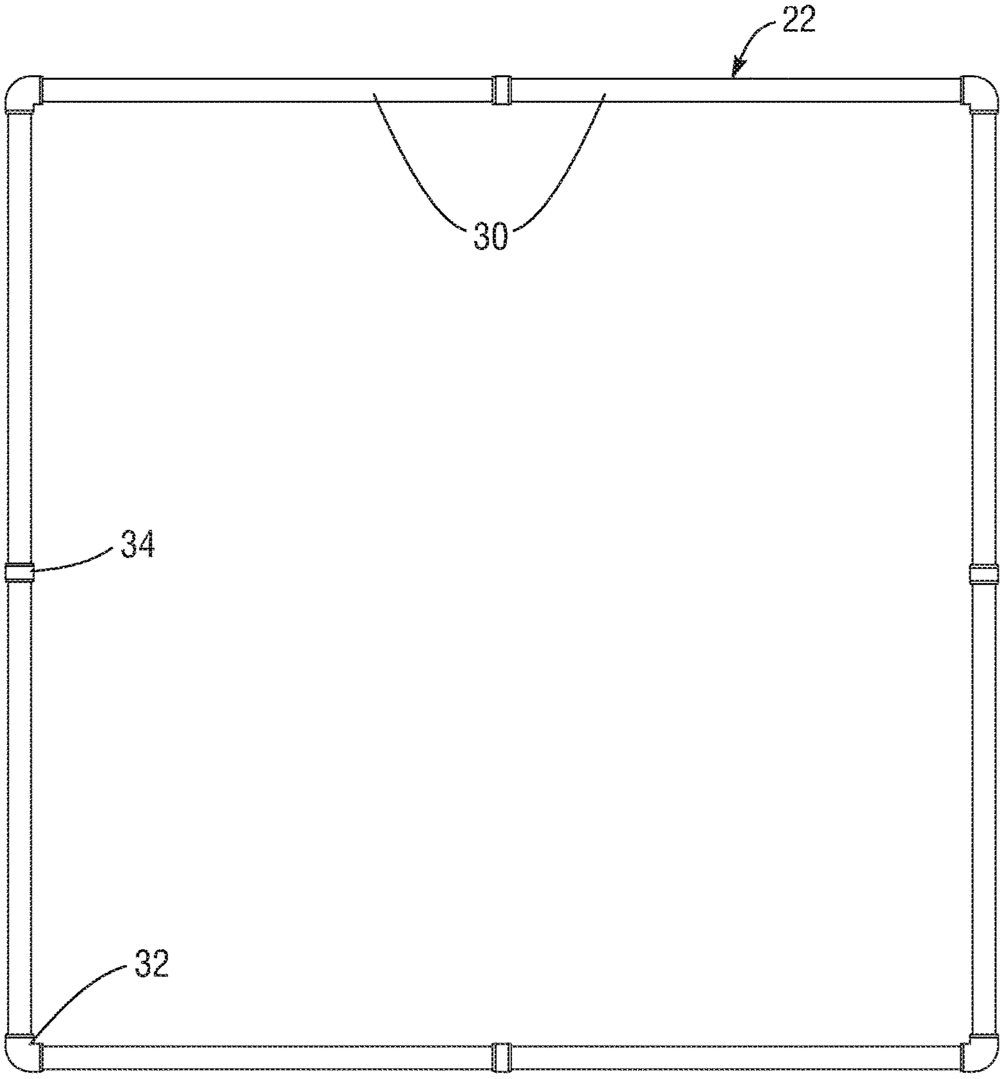
FIG. 12 is a top plan view of the border pontoon.
Figure 13A:
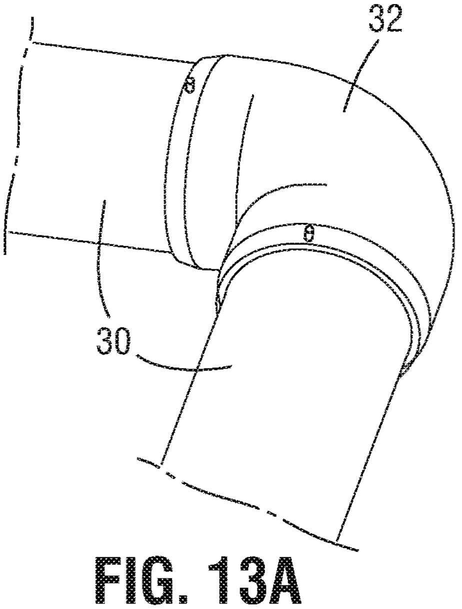
FIG. 13A is an enlarged view of a corner elbow junction of the border pontoon.
Figure 13B:
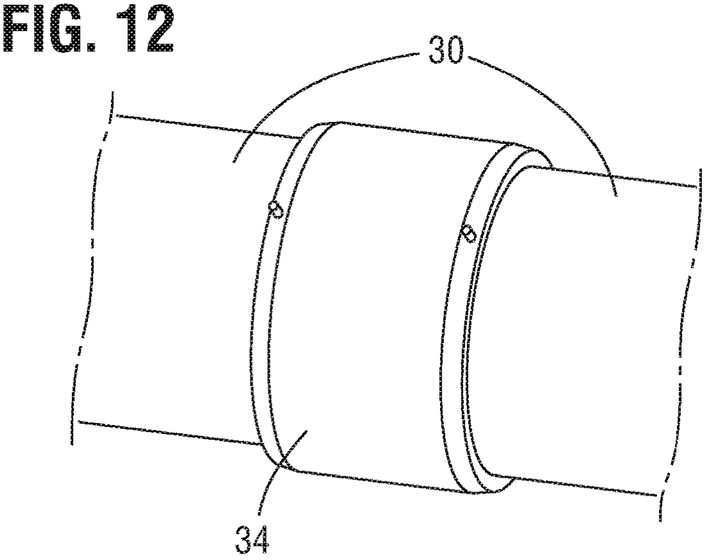
FIG. 13B is an enlarged view of a series junction of the border pontoon.

FIGS. 12-13 illustrate an exemplary border pontoon 22 comprising a plurality of straight tubular sections 30 coupled together in series with sleeve-like junctions 32, 34. Specifically, the tubular sections 30 join at corner vertices using elbow junctions 32, while one or more straight junction 34 are provided along each straight side to reduce the maximum length of each of the tubular sections needed. In a preferred embodiment, the straight tubular sections 30 and junctions 32, 34 are made of high density polyethylene and are connected together by electrofusion. Furthermore, the tubular sections 30 may comprise polyethylene pipes partly filled with water for ballast.

Figure 6:
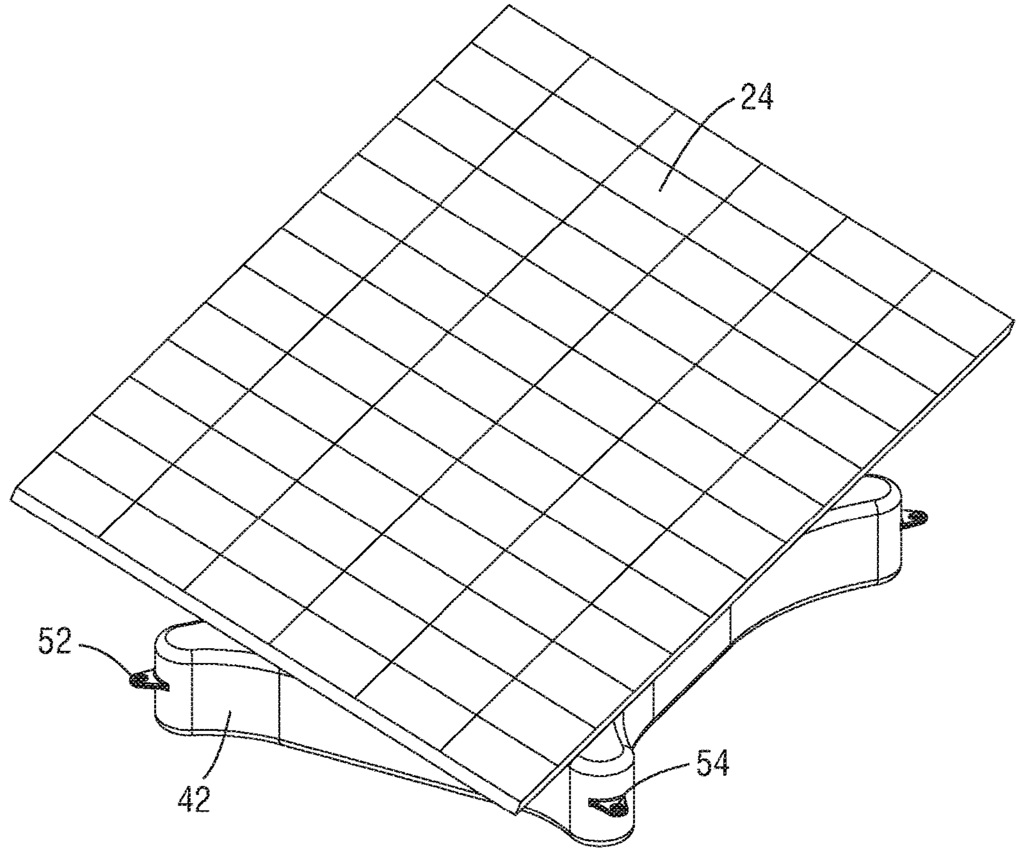
FIG. 6 is a perspective view of an individual photovoltaic panel mounted on a floating frame.
Figure 7:
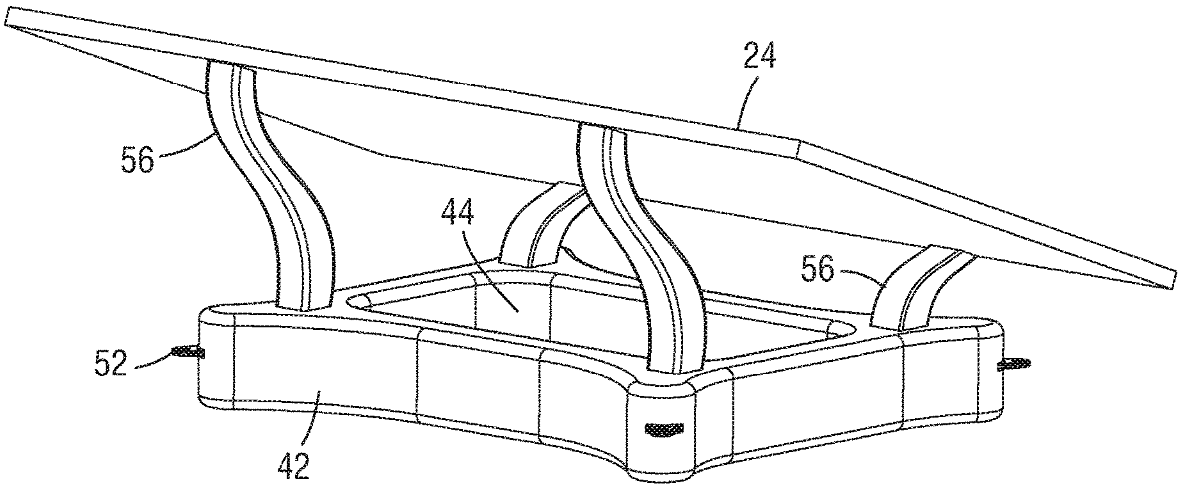
FIG. 7 is a different perspective view of the photovoltaic panel mounted on the floating frame.

With reference back to FIG. 1, the floating solar system 20 includes the buoyant border pontoon 22, as well as a number of floating boxes 40 provided within the interior space for supporting the photovoltaic panels 24. As best seen in FIGS. 6 and 7, each individual photovoltaic panel 24 is mounted on a floating frame 42. One or more rows of floating boxes 40 surround the array of panels 24 on their respective frames 42. In the illustrated embodiment, there are two connected rows of floating boxes 40 around an array of twenty-four panels 24 in a 4×6 grid. An inner row of floating boxes 40 immediately surrounding the array of floating frames 42 is connected to the frames, as will be explained below. Likewise, the inner row of floating boxes 40 is connected to an outer row of floating boxes. Finally, the outer row of floating boxes 40 is flexibly coupled to the surrounding border pontoon 22 by a flexible net or mesh 50. Due to the rectangular nature of the floating solar system 20, the net or mesh 50 may be provided in sections along each side, or maybe a single continuous piece.

The plurality of floating boxes 40 surrounding and attached to the array of photovoltaic panels 24 and floating frames 41 defines a floating solar array in the interior space within the closed peripheral shape defined by the border pontoon 22. The width of the flexible net or mesh 50 on each side of the floating solar array that is wider than the space between the floating solar array and the border pontoon on that side to allow for relative movement of the floating solar array and border pontoon. However, the width of the flexible net or mesh 50 is not so wide that the floating solar array on an opposite side can contact the border pontoon. That is, the width of the flexible net or mesh 50 provides some "elasticity" of sorts between the floating solar array and border pontoon which permits some relative floating movement but prevents any collisions therebetween.

The array of twenty-four panels 24 is desirably grouped in pairs of adjacent rows that are angled from the horizontal to reduce the drag effect of high winds. In the illustrated embodiment, there are three pairs of adjacent rows of four panels 24 each, with each pair having panels 24 that are angled upward toward each other. This results in three pairs of tent-like rows, with the panels 24 being angled anywhere between 5-25 degrees, preferably 15-20 degrees, from the horizontal. As mentioned, there may be more or less than twenty-four total panels, but the arrangement is preferably the same with a plurality of pairs of rows with the panels angled upward toward each other.

Referring to FIGS. 6 and 7, an exemplary floating frame 42 under each photovoltaic panel 24 may be formed by a hollow plastic structure generally in the shape of a rectangle surrounding an inner opening 44. The frame 42 may have outwardly-projecting corners 48 terminating in connection brackets 52 with eyelets 54 therein for connection to adjacent frames or floating boxes 40. A plurality of upwardly-extending arms 56 are welded or bonded or otherwise affixed to an upper surface of the corners of the frame 42, and provide support for the photovoltaic panel 24. In a preferred embodiment, the arms 56 are arcuate in configuration to support the panel 24 in its angled configuration, with two arms 56 on one side being longer than the other two arms. As shown, the arms 56 are desirably square tubes molded to have the particular arcuate form as shown and welded or bonded, or otherwise firmly attached to the underside of each of the panels 24.

The floating solar system 20 further may include a downwardly depending stabilizing skirt 60 below each side of the pontoon 22. As seen in FIG. 2, the skirt 60 may be formed by a vertical net or mesh 62 attached to the respective side of the pontoon 22. A ballast weight such as piping 64 is provided at the lower end of the vertical net or mesh 62, such as within a closed linear pocket. In one embodiment, the straight piping 64 along each side is joined at a corner section 66 to the adjacent sections of piping 64. FIG. 5 is a side elevational view of a modified solar system 20 without the stabilizing skirt 60. The skirt 60 may be useful in certain environments, but also adds complexity and cost and so may not always be needed.

Figure 8:
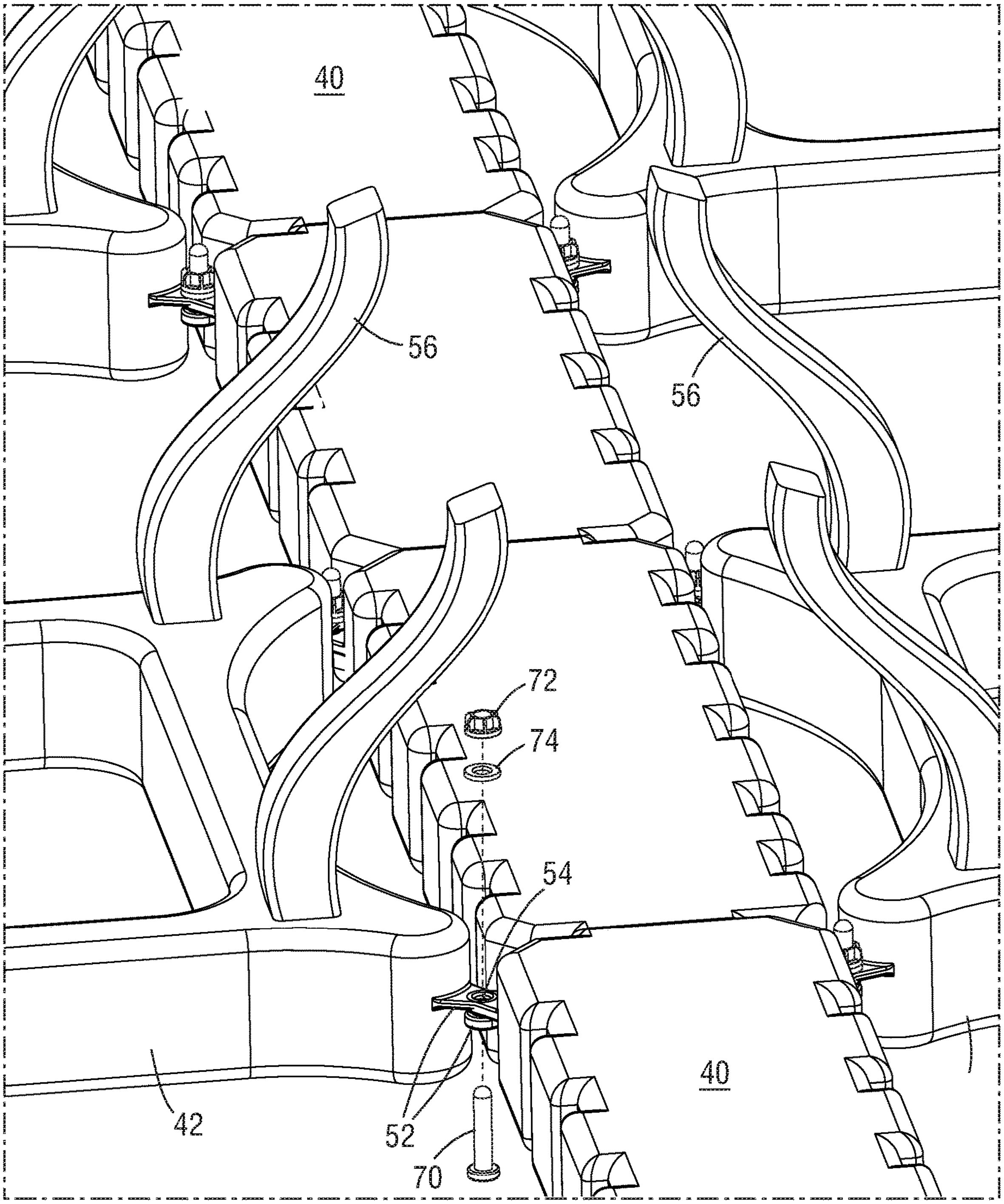
FIG. 8 is a perspective view of a plurality of floating frames and support arms attached by a row of floating boxes.

FIG. 8 is a perspective view of a plurality of floating frames 42 and support arms 56 attached by a row of floating boxes 40. Plastic bolts 70 and nuts 72 with washers 74 are desirably used to connect overlapping connection brackets 52 with eyelets 54 on each of the adjacent floating members. FIG. 8 shows an intervening row of floating boxes 40 between each adjacent row of floating frames 42, which provides room for photovoltaic panels 24 that are larger in square area or vertical footprint than the accompanying floating frame 42. Likewise, each two adjacent floating frame 42 in each row may be separated by a floating box 40, again to provide greater spacing between for larger panels 24.

FIG. 9 is an enlarged perspective view of one corner of the solar system 20 illustrating the flexible nets or mesh 50 extending between outer rows of floating boxes 40 and the border pontoon 22, as well as a stabilizing skirt 60. The flexible nets or mesh 50 to the outer pontoon 22 by either wrapping around it or providing attachment point such as flanges with eyelets or grommets. Those of skill in the art will understand a number of ways to connect the flexible nets or mesh 50 to the tubular members of the border pontoon 22.

FIG. 10 is a perspective view of several of the outer floating boxes 40 and a portion of the flexible net or mesh 50 attached thereto. In one embodiment, periodic points along the net or mesh 50 are captured between the securing system of the plastic bolts 70 and nuts 72, with or without washers 74, as will be explained below.

Figure 11A:
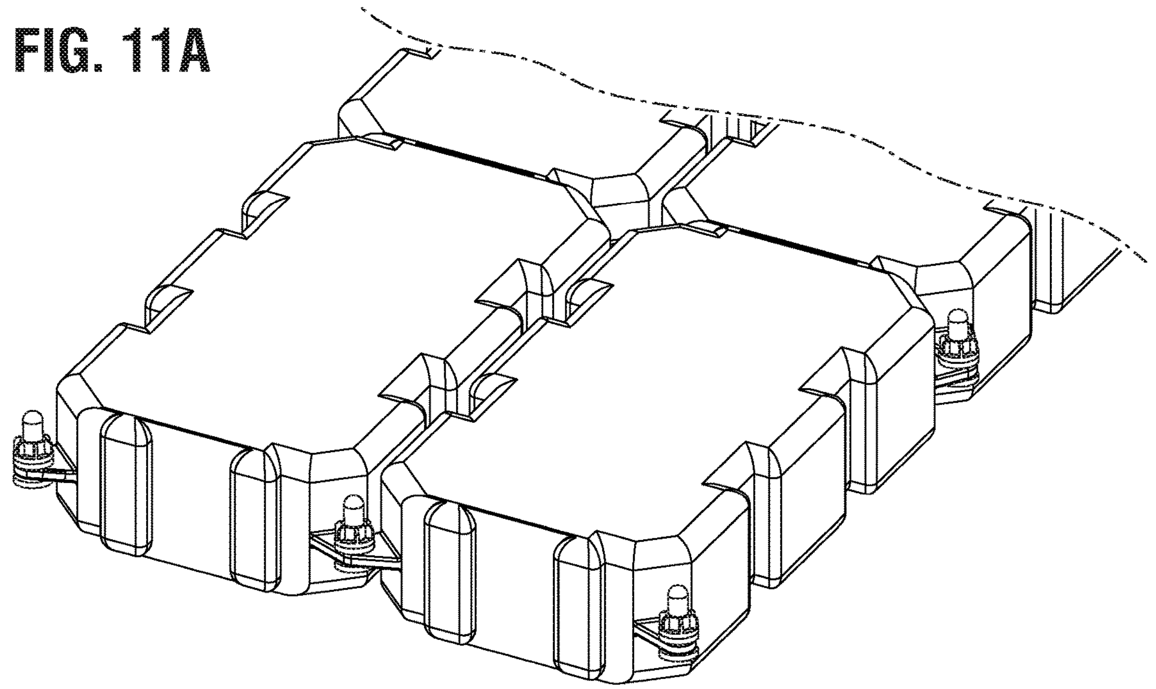
FIG. 11A is a perspective view of adjacent rows of floating boxes attached together with plastic bolt and nut connectors.
Figure 11B:
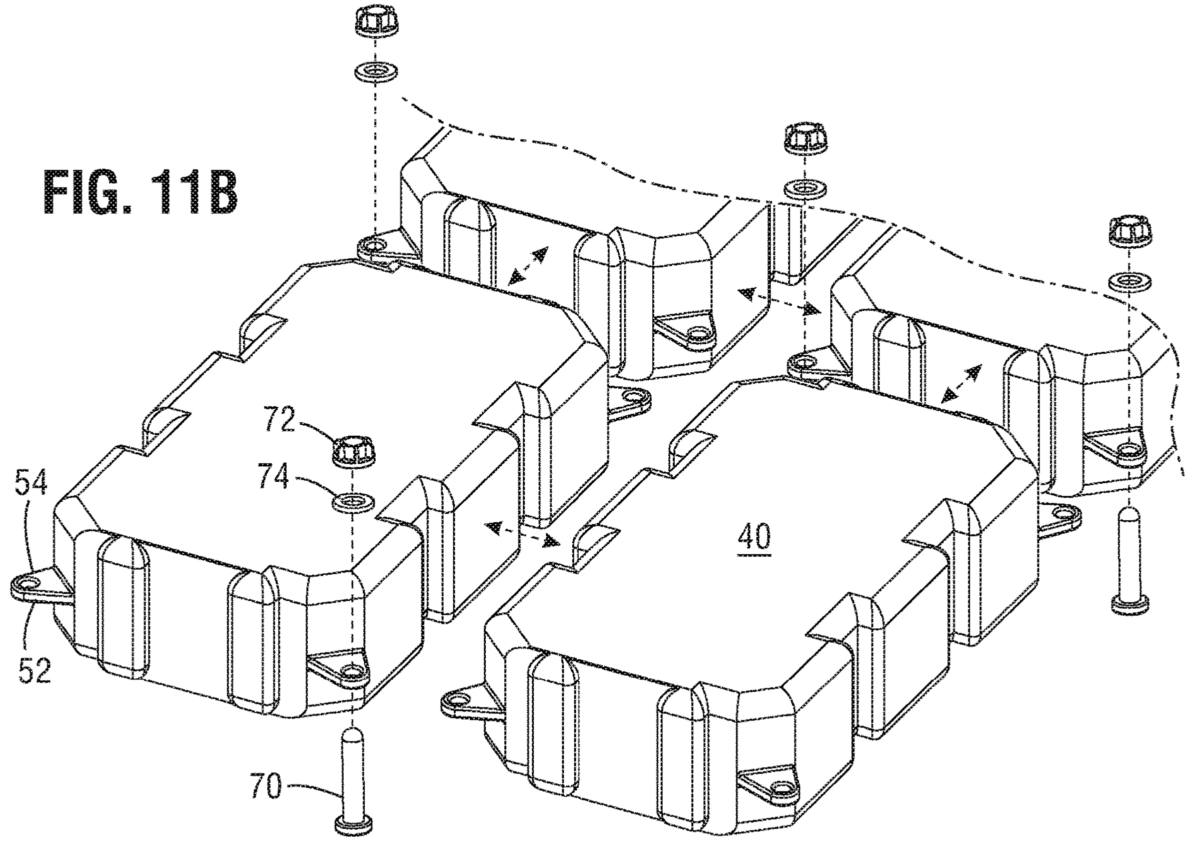
FIG. 11B is an exploded perspective view thereof.

FIG. 11A is a perspective view of adjacent rows of floating boxes 40 attached together with plastic bolt 70 and nut 72 connectors, and FIG. 11B is an exploded perspective view thereof. As mentioned, the floating boxes 40 also have connection brackets 52 with eyelets 54 at each corner. These brackets 52 are the same or similar to those described above for the floating frames 42. The brackets 52 each project diagonally outward far enough to overlap a bracket on an adjacent box or frame 40, 42 such that the eyelets 54 are aligned. The plastic bolt 70 and nut 72/washer 74 assembly is then used to secure the two brackets 52 together. Further detail of this configuration will be provided below.

Figure 14A:
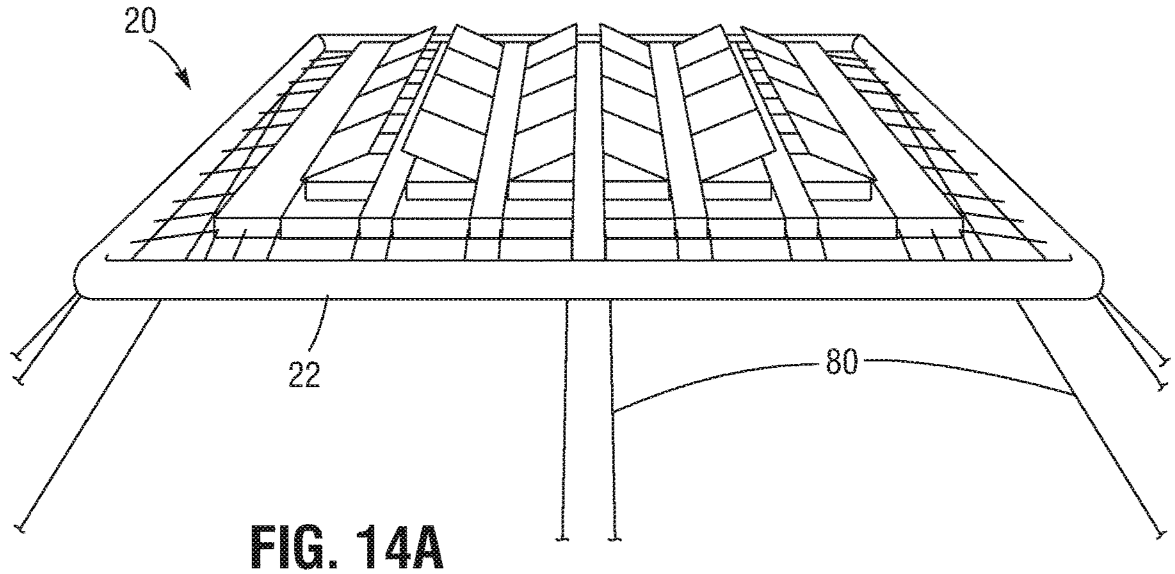
FIG. 14A is a perspective view of a floating solar system as disclosed herein with anchoring tethers extending downward therefrom.
Figure 14B:
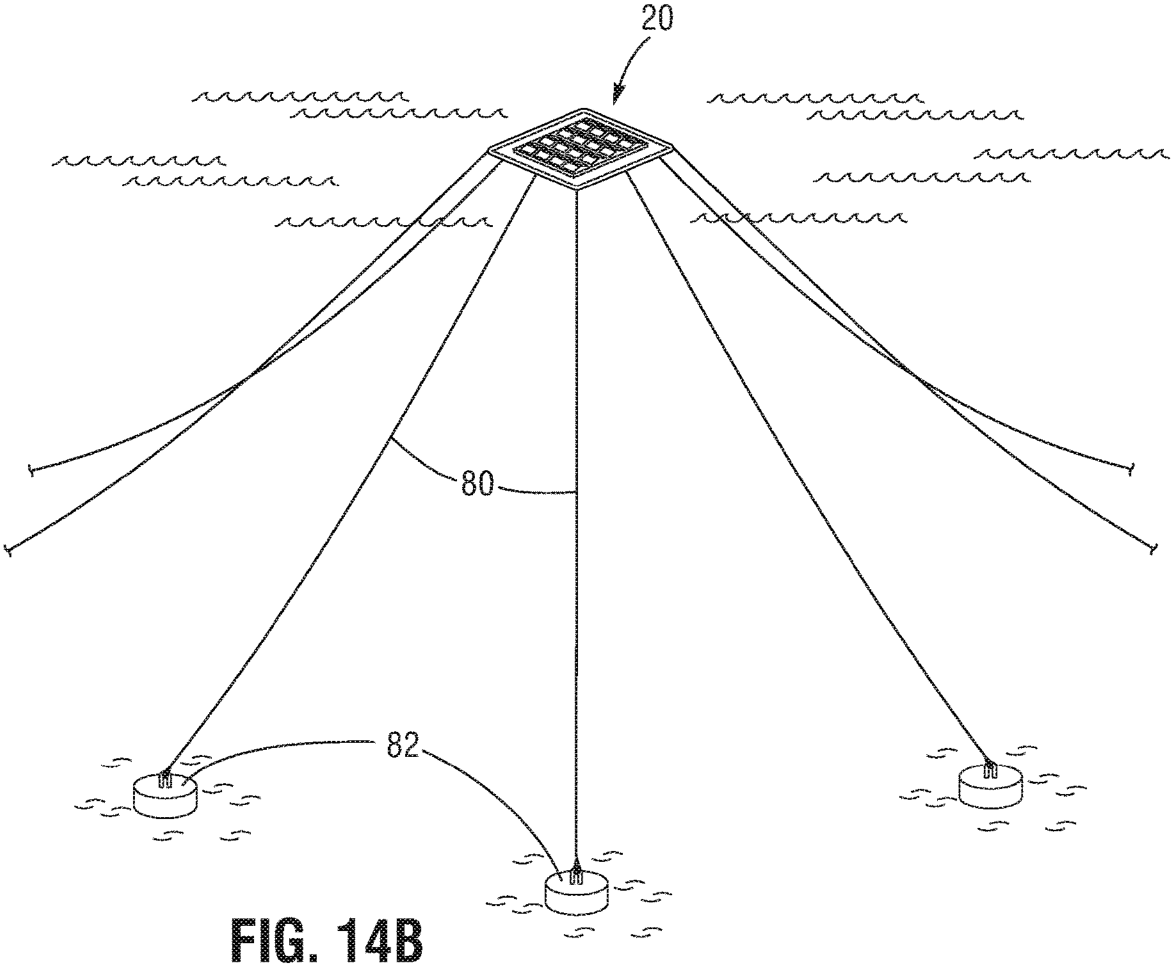
FIG. 14B is a zoomed out view showing an exemplary arrangement for anchoring on a seabed or lakebed.

FIG. 14A is a perspective view of a floating solar system 20 with anchoring tethers 80 extending downward therefrom, and FIG. 14B is a zoomed out view showing an exemplary arrangement for anchoring on a seabed or lakebed. Specifically, the tethers 80 extend downward to anchoring weights 82 resting on the seabed or lakebed. The arrangement of multiple tethers 80 on each side of the border pontoon 22 provides excellent stability.

Figure 15A:
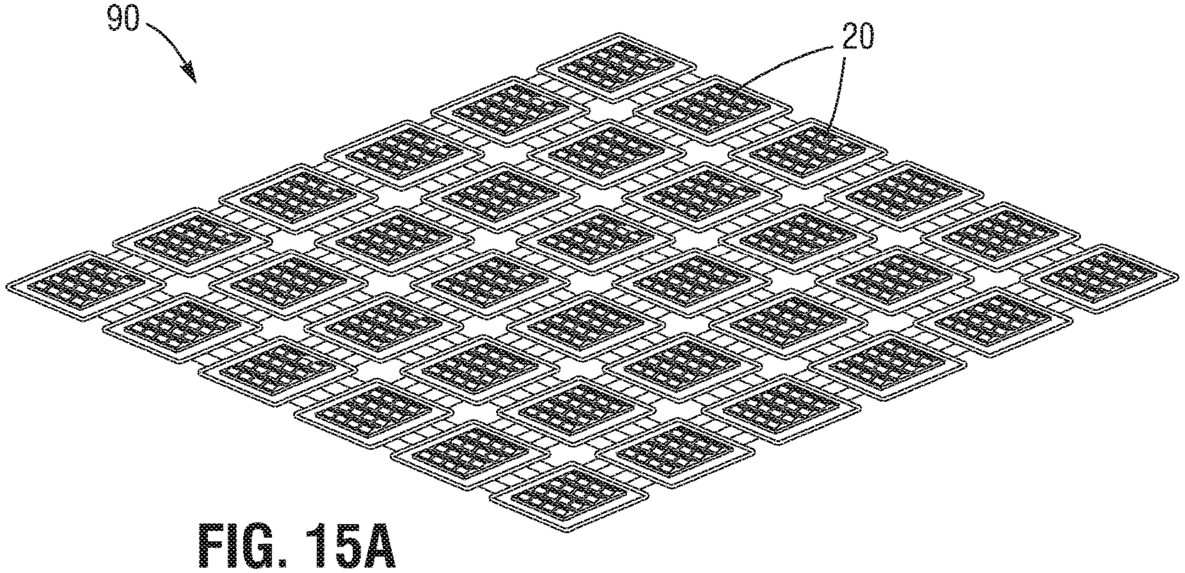
FIG. 15A is a perspective view of a floating solar island comprising a plurality of interconnected floating solar systems.
Figure 15B:
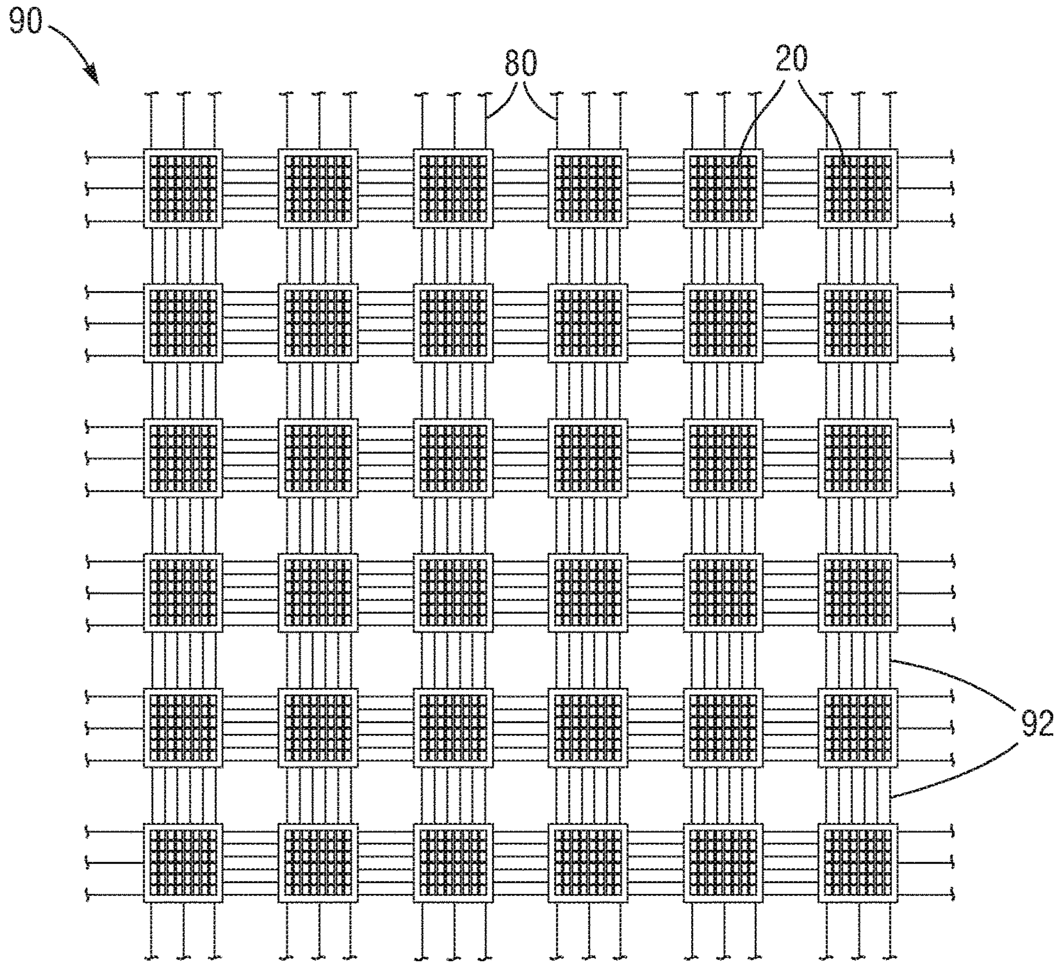
FIG. 15B is a top plan view of the floating solar island indicating an outer series of anchoring tethers extending therefrom.

FIG. 15A is a perspective view of a floating solar island 90 comprising a plurality of interconnected floating solar systems 20, and FIG. 15B is a top plan view of the floating solar island indicating an outer series of anchoring tethers 80 extending therefrom. When aggregated together into an island 90, only the outer rows of solar systems 20 require tethers 80. In between each of the solar systems 20 are provided a number of cables or semi-flexible links 92 attaches between adjacent border pontoons 22. The links 92 preferably have some column strength to prevent excess movement of each of the solar systems 20 toward each other and avoid contact therebetween, while being somewhat flexible to allow for some relative movement from wind or wave action and prevent excessive tensile stresses. One example would be nylon marine ropes or a plastic multi pipes connection for HDPE pipes.

Figure 16:
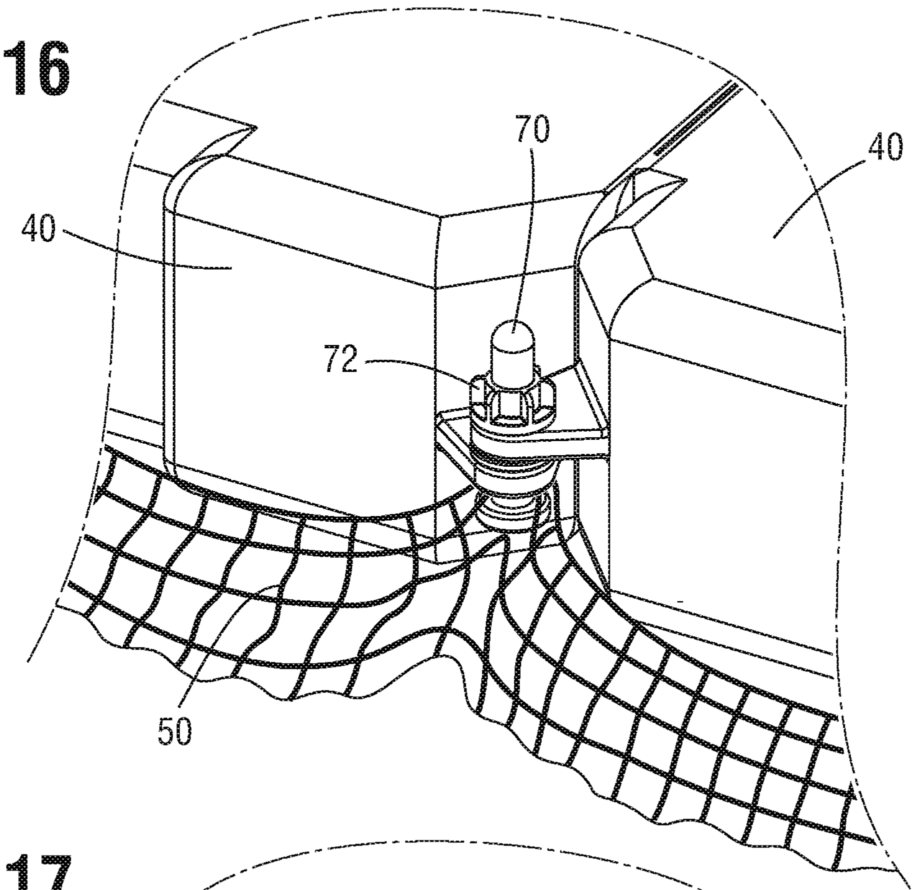
FIG. 16 is a perspective view of flexible netting attached to the connector between two floating boxes.

FIG. 16 is a perspective view of flexible netting 50 attached to the connector between two floating boxes 40. In particular, the plastic bolt 70 used in the connector passes through one or more of the holes formed in the netting 50 before being secured at the connector by the upper nut 72. The netting 50 is desirably formed of woven polymer strands such as polyethylene.

Figure 17:
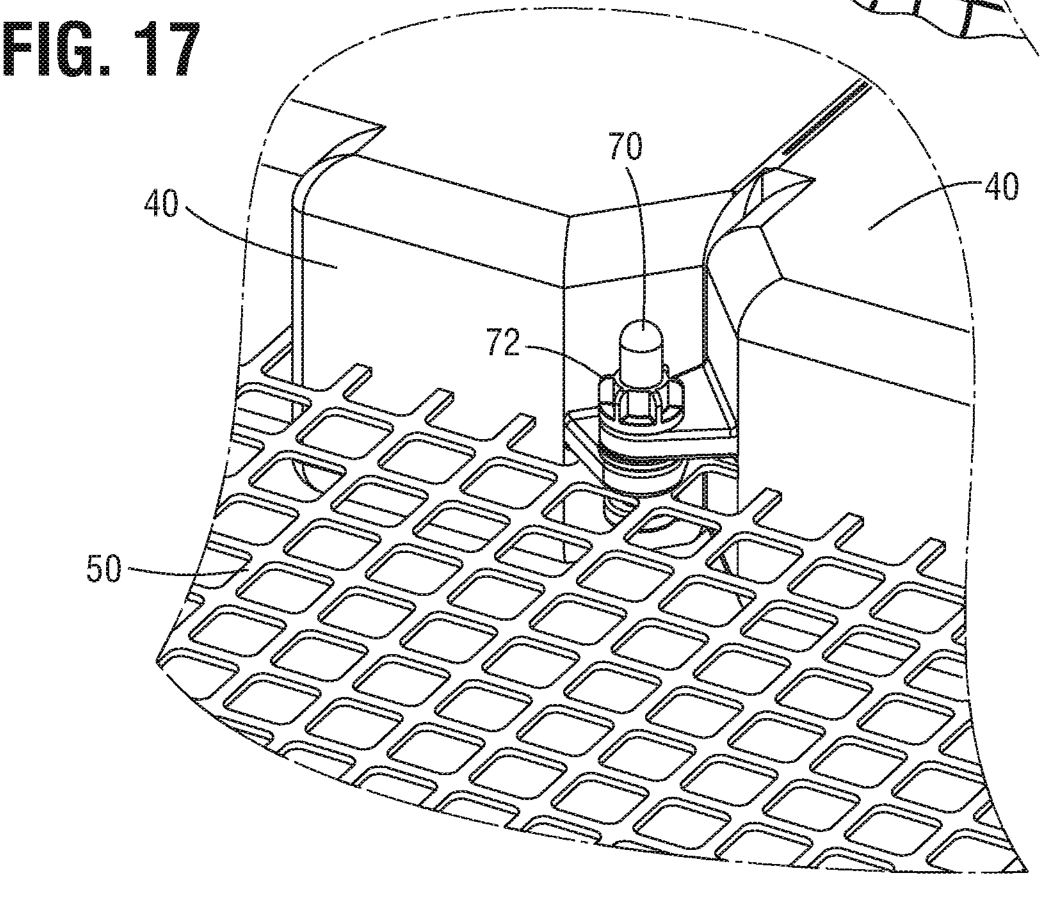
FIG. 17 is a perspective view of a flexible mesh attached to the connector between two floating boxes.

FIG. 17 is a perspective view of a flexible mesh 50 attached to the connector between two floating boxes 40. Again, the plastic bolts 70 in the connector passes through one of the holes formed in the mesh 50 before being secured at the connector by the upper nut 72. The flexible mesh 50 is desirably formed of a molded polymer such as polyethylene with holes therein, and has greater compressive strength than netting, but is still capable of up-and-down flexure.

Figure 18:
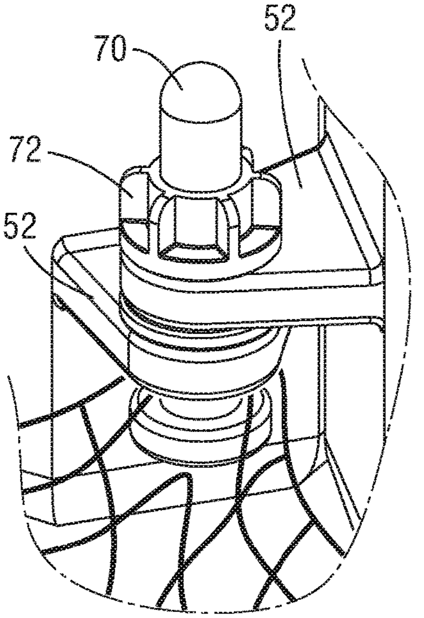
FIG. 18 is an enlarged assembled view of one embodiment of a connector between two floating boxes, two floating frames, or between boxes and frames.
Figure 19A:
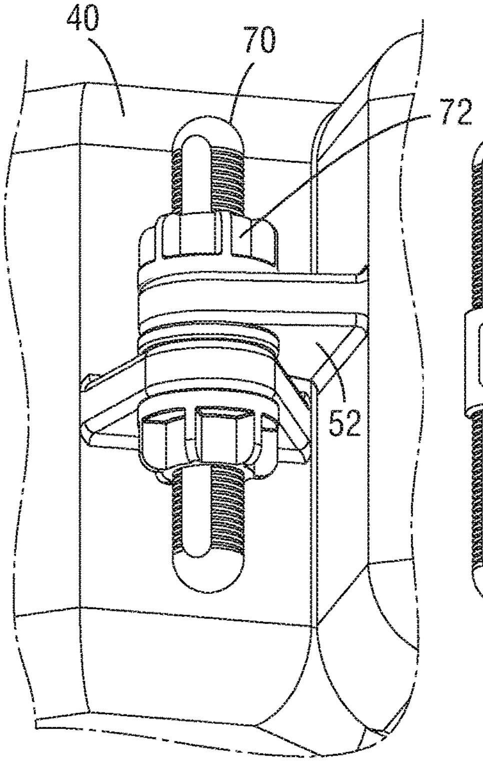
FIG. 19A is an enlarged assembled view of the connector of FIG. 18.
Figure 19B:
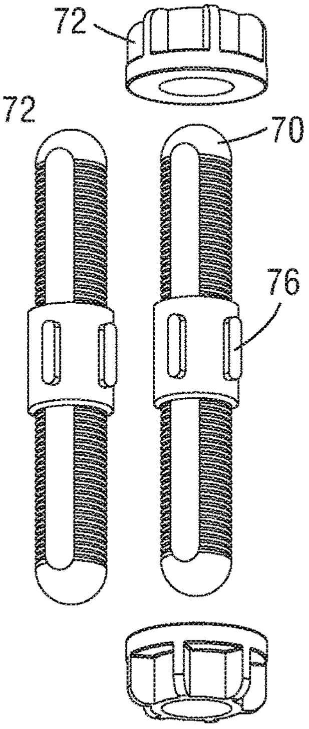
FIG. 19B is an exploded view thereof.

FIG. 18 is an enlarged assembled view of one embodiment of a connector between two floating boxes 40, two floating frames 42, or between boxes and frames. FIG. 19A is an enlarged assembled view of the connector of FIG. 18, and FIG. 19B is an exploded view thereof. The connector comprises a plastic threaded rod 70 passed through aligned eyelets in the brackets 52 on the corners of the respective floating box or frame secured with opposed plastic nuts 72 on each side of the assembly. Alternatively, the plastic threaded rod 70 may have an integral head on the lower end so that just one nut 72 is needed. The diameter of the threaded rod 70 is desirably slightly smaller than the openings in the netting 50. Along a central unthreaded shaft portion of the rod 70 are provided a plurality of longitudinal ribs 76 which mate with similarly-sized and arranged grooves (not shown) on the inside of each of the eyelets 52. Engagement of the ribs 76 with the grooves in the eyelets 52 prevent the threaded rod 70 from rotating about its axis.

Figure 20A:
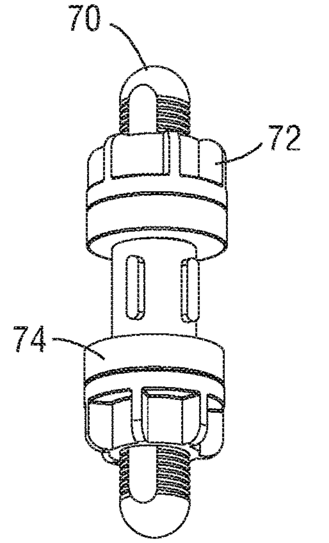
FIG. 20A is an enlarged assembled view of an alternative connector similar to the connector of FIG. 18 but with the addition of soft washers.
Figure 20B:
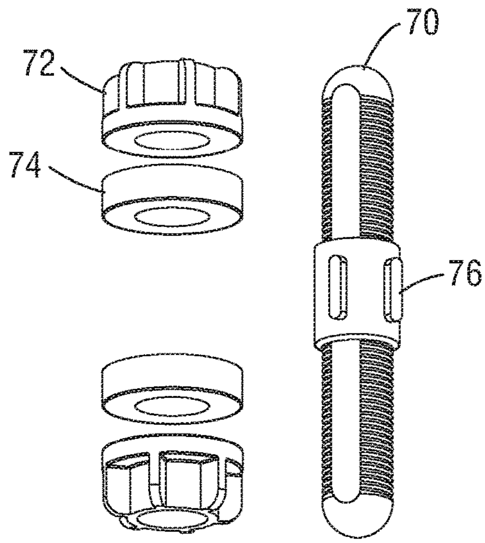
FIG. 20B is an exploded view thereof.

FIG. 20A is an enlarged assembled view of an alternative connector similar to the connector of FIG. 18 but with the addition of soft washers 74, and FIG. 20B is an exploded view thereof. The plastic threaded rod and two opposed plastic nuts on each side of the rod may be supplemented by two washers (or one washer only also possible). The washers 74 may be made of polyethylene, Teflon, or some other soft or otherwise compressible material.

While the invention has been described in its preferred embodiments, it is to be understood that the words which have been used are words of description and not of limitation. Therefore, changes may be made within the appended claims without departing from the true scope of the invention.

What is claimed is:

1. A floating solar system, comprising:

a border pontoon adapted to float on water defining a closed peripheral shape surrounding an interior space;

an array of interconnected photovoltaic panels distributed within the peripheral shapes, each individual panel being supported by a floating frame;

a plurality of floating boxes attached to adjacent floating frames or adjacent floating boxes, the plurality of floating boxes including an outer row of floating boxes surrounding the array of photovoltaic panels and floating frames and defining a floating solar array in the interior space; and a flexible net or mesh extending between and connected to both the outer row of floating boxes and the border pontoon via bolts that also connect each two adjacent floating boxes in the outer row, wherein the flexible net or mesh has a width on each first side of the floating solar array that is wider than the space between the floating solar array on the first side and the border pontoon on the first side to allow for relative movement between the floating solar array and border pontoon, but the width is not so wide that the floating solar array on a second side opposite the first side can contact the border pontoon.

2. The system of claim 1, wherein the border pontoon comprises a plurality of polymer tubular pipes connected in series at sleeve junctions secured by electrofusion.

3. The system of claim 2, wherein the tubular pipes are made of high density polyethylene.

4. The system of claim 2, wherein the peripheral shape is square or rectangular and the border pontoon includes four straight sides connected at four corners.

5. The system of claim 1, wherein the tubular pipes are partially filled with water for ballast.

6. The system of claim 1, wherein the flexible net or mesh is connected to the border pontoon via attachment points on the border pontoon including flanges with eyelets or grommets to which the flexible net or mesh attaches.

7. The system of claim 1, wherein the floating boxes each have connection brackets with eyelets at each corner thereof, and are directly attached to adjacent floating boxes with bolt and nut connectors that pass through eyelets that overlap for adjacent floating boxes.

8. The system of claim 7, wherein the flexible net or mesh is connected to the outer row of floating boxes by capturing periodic points along the flexible net or mesh with the plastic bolt and nut connectors between adjacent floating boxes.

9. The system of claim 1, wherein the flexible net or mesh is formed of woven polymer strands.

10. The system of claim 1, wherein the flexible net or mesh is formed of a molded polymer with holes therein.

11. The system of claim 1, further including a downwardly depending stabilizing skirt attached to each side of the border pontoon formed by a vertical net or mesh.

12. The system of claim 11, further including a ballast weight is provided at the lower end of the vertical net or mesh.

13. The system of claim 12, wherein the weight comprises piping held within a closed linear pocket in the vertical net or mesh.

14. The system of claim 1, wherein each floating frame is formed by a hollow plastic structure generally in the shape of a rectangle surrounding an inner opening and have outwardly-projecting corners terminating in connection brackets with eyelets therein for connection to adjacent frames or floating boxes.

15. The system of claim 14, wherein each floating frame has a plurality of upwardly-extending arms affixed to an upper surface of the corners of the frame and providing support for one of the photovoltaic panels.

16. The system of claim 15, wherein the arms support the panel in an angled configuration, with two arms on one side being longer than two arms on the other side.

17. The system of claim 15, wherein the arms are square tubes molded to have an arcuate form.

18. The system of claim 1, wherein a plurality of interconnected floating solar systems are connected together to form a floating solar island from which anchoring tethers extend downward for anchoring on a seabed or lakebed.

19. The system of claim 18, wherein a number of cables or semi-flexible links extend between adjacent floating solar systems and attach at border pontoons, the cables or semi-flexible links having column strength to prevent excess movement of the floating solar systems toward each other, while being flexible to allow for relative movement therebetween from wind or wave action.

20. A floating solar system, comprising:

a border pontoon adapted to float on water defining a closed peripheral shape surrounding an interior space;

an array of interconnected photovoltaic panels distributed within the peripheral shapes, each individual panel being supported by a floating frame;

a plurality of floating boxes attached to adjacent floating frames or adjacent floating boxes, the plurality of floating boxes including an outer row of floating boxes surrounding the array of photovoltaic panels and floating frames and defining a floating solar array in the interior space, wherein the floating boxes each have connection brackets with eyelets at each corner thereof, and are directly attached to adjacent floating boxes with bolt and nut connectors that pass through eyelets that overlap for adjacent floating boxes; and a flexible net or mesh extending between and connected to both the outer row of floating boxes and the border pontoon.

21. The system of claim 20, wherein the border pontoon comprises a plurality of polymer tubular pipes connected in series at sleeve junctions secured by electrofusion.

22. The system of claim 20, wherein the peripheral shape is square or rectangular and the border pontoon includes four straight sides connected at four corners.

23. The system of claim 20, wherein the flexible net or mesh is connected to the outer row of floating boxes by capturing periodic points along the flexible net or mesh with the plastic bolt and nut connectors between adjacent floating boxes.

24. The system of claim 20, further including a downwardly depending stabilizing skirt attached to each side of the border pontoon formed by a vertical net or mesh.

* * * * *